United States Patent [19]

Kai et al.

[11] Patent Number: 4,709,988
[45] Date of Patent: Dec. 1, 1987

[54] DIRECTIONAL LIGHT-SHIELD BOARD

[75] Inventors: Yasuaki Kai; Takatoshi Sagawa; Hiroshi Tabata, all of Yokohama, Japan

[73] Assignee: Nissan Motor Co., Ltd., Yokohama, Japan

[21] Appl. No.: 794,844

[22] Filed: Nov. 4, 1985

[30] Foreign Application Priority Data

Nov. 17, 1984 [JP] Japan .................. 59-241622

[51] Int. Cl.$^4$ .................................................. G02B 5/00
[52] U.S. Cl. .................................................. 350/276 R
[58] Field of Search ............ 350/276 R, 276 SL, 284, 350/330, 335, 339 R, 344, 319, 322

[56] References Cited

U.S. PATENT DOCUMENTS 3,511,563  5/1970  Erwin ........................ 350/276 R
3,996,458 12/1976  Jones et al. ................. 350/276 R
4,506,953  3/1985  Shimizu et al. .............. 350/276 R

FOREIGN PATENT DOCUMENTS 57-189439 11/1982 Japan .

Primary Examiner—Bruce Y. Arnold
Assistant Examiner—Loha Ben
Attorney, Agent, or Firm—Schwartz, Jeffery, Schwaab, Mack, Blumenthal & Evans

[57] ABSTRACT

Disclosed is a light-shield board for placement in front of a visual display device such as a cathode-ray tube in a television set or an information system. The light-shield board comprises a transparent substrate and an opaque film which is bonded to the substrate and is formed with a number of substantially uniformly distributed light-transmitting apertures, which may be rectangular apertures arranged in a checkered pattern. So, the opaque film comprises wall-like parts respectively partitioning the apertures. The apertures are bored obliquely such that at least a selected portion of the wall-like parts of the film are unidirectionally inclined from a plane normal to the film. Besides the function of restricting the angle of incidence of extraneous light on the display screen, this light-shield board serves the purpose of controlling the angles of diffusion of light from the display screen and hence enabling to sight the display screen from limited directions only. For example, by applying this light-shield board to a car television set in the instrument panel it is possible to disenable the driver to sight the television screen while a passenger in the front seat next to the driver can sight the screen.

11 Claims, 14 Drawing Figures

DIRECTIONAL LIGHT-SHIELD BOARD

BACKGROUND OF THE INVENTION

This invention relates to a directional light-shield board, which is to be placed in front of a visual display screen for preventing degradation of the contrast of the displayed images by the influence of extraneous light and also for disenabling to sight the display screen from unwanted directions.

For visual displays such as cathode-ray tubes and liquid crystal displays in television sets or information systems represented by computers, various types of shade or light-shield boards have already been proposed for placement in front of the displays to restrict the angle of incidence of extraneous light to thereby prevent degradation of the contrast of the displayed pictures or characters by reflection of extraneous light. Some of hitherto proposed light-shield boards have an additional effect of limiting the angles of diffusion of light emitted from the display screen and therefore disenabling to sight the display screen from unwanted directions.

Among the above prior art, Japanese patent application primary publication No. 57-189439 (1982) shows a light-shield board consisting of a transparent substrate and an opaque film which is bonded to the transparent substrate and is formed with a number of light-transmitting apertures. The apertures have a rectangular shape and are formed in a checkered pattern, so that the opaque film exists as a grillwork. The apertured opaque film can be produced by a photolithographic method using a photosensitive resin containing a matting agent and a subsequent dyeing process. Since the opaque film has a substantial thickness, each aperture is defined by walls standing normal to the transparent substrate. Therefore, the light-shield board serves the function of limiting the angle of incidence of extraneous light on the display screen behind this board so that the contrast of the displayed images may not be degraded.

This light-shield board places a limit also on the angle of diffusion of light from the display screen. Though this is favourable for some purposes, in most cases this offers an inconvenience that the display becomes dark for a viewer whose line of sight is oblique to the light-shield board and the display screen.

There are particular cases where it is desirable to render a display screen unsightable from a specific direction. In the case of a cathode-ray tube installed in the instrument panel of an automobile for receiving television or for displaying some information such as a guide map, it will be desirable for the sake of safety to render the screen unsightable from the driver's seat while the car is running. Especially in the night the driver will be annoyed if flickering of light attributed to frequent scene transitions in the televised pictures comes into sight. On the other hand it is desirable that the screen can always be sighted from the back seat and also from the front seat next to the driver's seat. The prior art does not include a light-shield board that satisfies such desires. Therefore, it becomes necessary to employ an extra means such as placement of a shade screen between the display and the driver's seat or supplement of a mechanism to turn the picture tube itself toward the front seat next to the driver's seat.

SUMMARY OF THE INVENTION

It is an object of the present invention to provide an improved light-shield board which is to be placed in front of a visual display device to prevent degradation of the displayed images by the influence of extraneous light and which has the function of limiting the direction from which the display screen is sightable without significantly lowering the lightness of the sighted display screen.

The present invention provides a directional light-shield board which comprises a transparent substrate and an opaque film which is bonded to a major surface of the substrate and is formed with a number of substantially uniformly distributed light-transmitting apertures such that the opaque film comprises a number of wall-like parts respectively partitioning the apertures. As the principal feature of this light-shield board, the light-transmitting apertures are bored obliquely such that at least a selected portion of the wall-like parts of the opaque film are substantially undirectionally inclined from a plane normal to the film, and hence normal to the aforementioned surface of the substrate, and such that an apparent area of each light-transmitting aperture becomes maximum when the board is viewed from the direction of the inclination of the wall-like parts of the opaque film.

A light-shield board according to the invention is placed in front of the screen of a visual display device such as a cathode-ray tube or a liquid crystal display. Owing to the existence of the opaque film formed with apertures, the angle of incidence of extraneous light on the display screen is restricted so that the light-shield board is effective for preventing degradation of the contrast of the displayed images by reflection of extraneous light. Furthermore, the inclination of the wall-like parts of the opaque film or, in other words, inclination of the light-transmitting apertures, from a plane normal to the film has the effect of controlling the directions of propagation of light from the display screen and therefore enabling to sight the display screen from limited directions only.

In a preferred embodiment, the light-transmitting apertures in the opaque film have a rectangular shape and are formed so as to produce a staggered checkered pattern. Consequently, each aperture is defined by two parallel and widthways extending wall-like parts of the film and two parallel and lengthways extending wall-like parts of the film. The widthways extending wall-like parts are inclined if it is intended to restrict upward and downward diffusion of light from the display screen, and the lengthways extending wall-like parts are inclined if it is intended to restrict rightward or leftward diffusion of the same light. If desired, the light-transmitting apertures may be parallel slits partitioned by inclined wall-like parts of the opaque film.

An apertured opaque film used in this invention can be produced by a photolithographic method using a photosensitive resin. In that case, the angle of incidence of actinic light on the masked resin layer is controlled so as to obliquely pass through the resin layer. Preferably a matting agent is added to the photosensitive resin in order to make the inner surfaces of the apertured film rough surfaces to thereby prevent appearance of ghost images. After formation of the inclined apertures, the opaqueness of the film may be augmented by suitable dyeing.

DESCRIPTION OF THE PREFERRED EMBODIMENTS

First, a practically convenient method of producing an aperture film as the principal element of a directional light-shield board according to the invention is described with reference to FIGS. 1 and 2. This production method is a photolithographic method.

Figure 1:
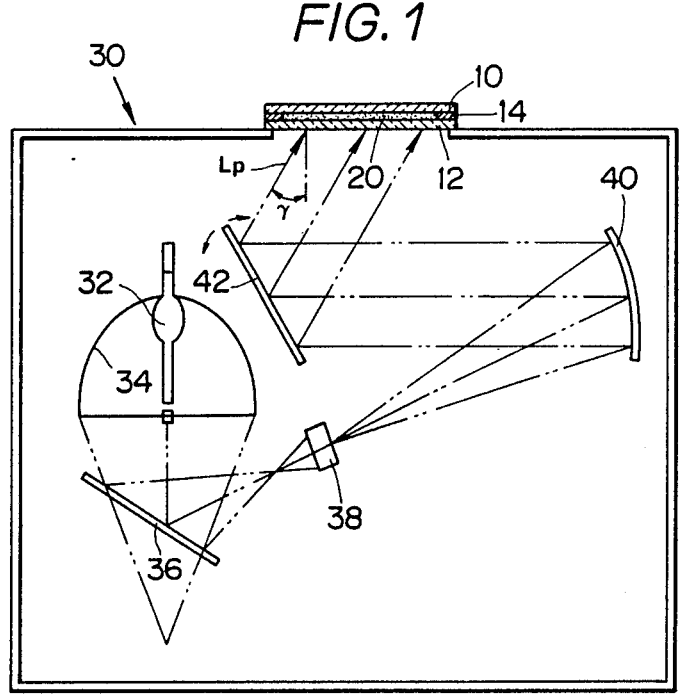
FIG. 1 is a schematic illustration of an exposure system used in producing an aperture film for a light-shield board according to the invention.
Figure 2:
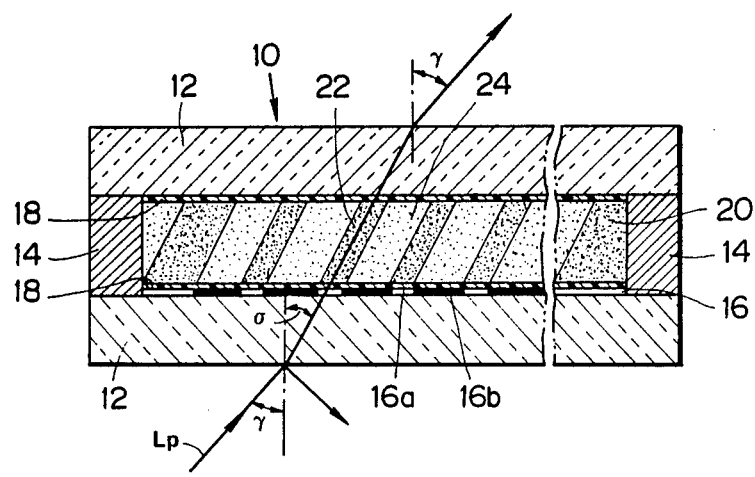
FIG. 2 is an explanatorily enlarged sectional view of a printing frame employed in the exposure system of FIG. 1.

FIG. 1 outlines an exposure system 30 for exposure of a layer of a photosensitive resin 20 confined in a printing frame 10 to parallel rays of light $L_p$ including an ultraviolet range of the spectrum. Referring to FIG. 2, the printing frame 10 is basically made up of two transparent glass plates 12 held parallel to and spaced from each other by a thin spacer 14 in the form of a rectangular frame. A mask sheet 16 having transparent areas 16a and opaque areas 16b in a pattern corresponding to the pattern of the aperture film to be produced is placed on the inner surface of the lower one of the glass plates 12.

In assembling the printing frame 10, first the mask sheet 16 is placed on the bottom glass plate 12. A transparent polyester film 18 is overlaid on the mask sheet 16, and the frame-shaped spacer 14 is placed on the marginal zone of the glass plate. Then a photosensitive liquid resin 20 employed as the material of the aperture film is applied, for example, by a doctor-blade method onto the mask sheet 16 overlaid with the polyester film 18 to a thickness determined by the thickness of the spacer 14. For example, the photosensitive resin is a polyurethane base resin containing about 5 wt % of a fine powder of silica having a mean particle size of about 7 μm. A transparent polyester film 18 is laid on the photosensitive resin layer 20, and the top glass plate 12 is placed on the spacer 14. The polyester films 18 are used as an optional means to facilitate releasing of the aperture film produced by photo-curing of a portion of the resin 20 from the printing frame 10. The materials of the glass plates 12, mask sheet 16 and photosensitive resin 20 are selected such that all the materials have approximately the same refractive index.

In the exposure system 30 the printing frame 10 containing the photosensitive resin 20 is set horizontally such that the light rays $L_p$ impinge on the glass plate 12 supporting the mask sheet 16. The exposure system 30 has an extra-high pressure mercury lamp 32 as the light source, a parabolic mirror 34, a half-mirror 36, a fly-eye lens 38, another parabolic mirror 40 and a plane mirror 42 which is rotatable. The parabolic mirror 34 reflects and converges the light from the light source 32 to the half-mirror 36 which allows near-infrared rays contained in the light to pass therethrough. The reflected ultraviolet and visible rays pass through the fly-eye lens 38 which serves the purpose of transmitting light rays of uniform intensity distribution to the parabolic mirror 40. The fly-eye lens 38 is positioned at the focus of the parabolic mirror 40 so that the light reflected from the parabolic mirror 40 consists of parallel rays $L_p$. The angular position of the plane mirror 42 is adjusted such that the parallel rays $L_p$ reflected from this mirror 42 impinge on the printing frame 10 at a predetermined angle of incidence $\gamma$. In this example the angle of incidence $\gamma$ is 45°. In this manner the printing frame 10 is irradiated with the parallel rays $L_p$, for example, for 70 sec at an irradiation intensity of 2.3 mW/cm².

Because of refraction at the outer surface of the glass plate 12 as the plane of incidence, light rays $L_p$ propagate through the glass plate 12 at an angle $\sigma$ (with the normal) smaller than the angle of incidence $\gamma$. In this example the refraction angle $\sigma$ is 28°. In the transparent areas 16a of the mask sheet 16 the light rays $L_p$ enter the photosensitive resin layer 20 and propagate through the resin layer 20 at the same angle $\sigma$ since both the mask sheet 16 and the resin layer 20 have approximately the same refractive index as the glass plate 12. The ultraviolet component of the light rays $L_p$ causes the photosensitive resin 20 to undergo cross-linking reaction and consequently to cure into a hard solid in the irradiated portions. Since the direction of propagation of the light is oblique to the photosensitive resin layer 20, curling of the resin 20 proceeds obliquely to result in formation of an array of cured regions 22 each of which extends obliquely (at the angle $\sigma$ with the normal) over the entire thickness of the resin layer 20. In the remaining regions 24 between the cured regions 22, the resin 20 is still in a liquid or readily soluble semiliquid state.

After the above described exposure operation the printing frame 10 is disassembled to take out the selectively cured resin layer 20, and the polyester films 18 are peeled away. The separated resin layer 20 is subjected to some treatments to remove the uncured regions 24 and to process the cured regions 22 into an aperture film for a light-shield board. The particulars of the treatments are widely variable depending on the kind of the used photosensitive resin. An example is as follows.

The partly cured photosensitive resin film 20 is held between two sheets of metal meshwork, and a hot and pressurized alkaline cleaning liquid containing 1 wt % of sodium borate is blown against the resin sheet alternately from the upper and lower sides to thereby dissolve out and completely remove the uncured regions 24. After drying in a hot-air oven, the already apertured resin film (22) is subjected to an after-exposure process using a chemical lamp of which the dominant wavelength is 370 nm to thereby achieve complete curing of the resin. After that, the nearly finished aperture film of the resin is immersed in a dye bath of a suitable black dye such as a metal ion-containing acid dye for about 30 min at about 50° C., followed by rinsing with an aqueous solution of a neutral detergent and subsequent drying with hot air. By such dyeing the aperture film is entirely rendered opaque. Finally, curling of the aperture film by the preceding treatments is remedied by hot-pressing, which may be accomplished by sandwiching the film between two aluminum plates heated to about 80° C. and applying a pressure of about 2.5 kg/cm$^2$.

Figure 3:
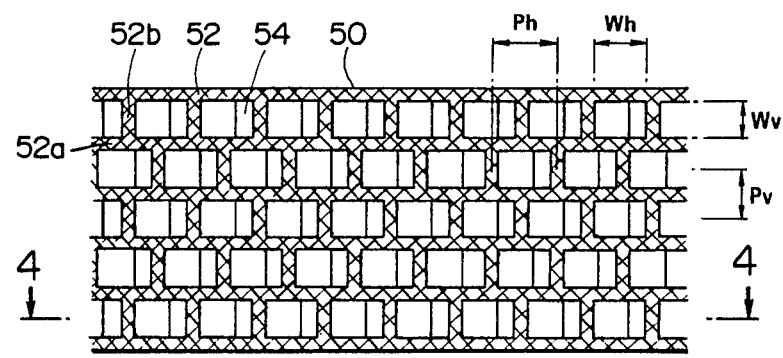
FIG. 3 is a partial and enlarged plan view of an aperture film used in an embodiment of the invention.
Figure 4:
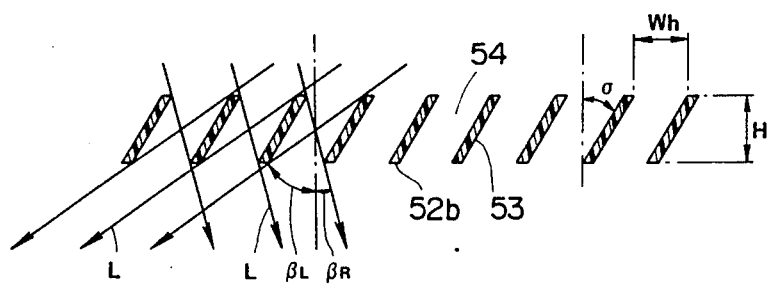
FIG. 4 is a sectional view taken along the line 4—4 in FIG. 3.

FIGS. 3 and 4 show an aperture film 50 produced by the above described method for use in a first embodiment of the invention. This aperture film 50 has a widthways oblong rectangular shape and is formed with a large number of rectangular apertures 54 for transmission of light therethrough. All the apertures 54 are identical in shape and size and are orderly arranged so as to provide a staggered checkered pattern. In other words, the film 50 consists of rows of widthways elongate regions 52a and a large number of lengthways extending regions 52b each of which is a bridge between two adjacent widthways elongate regions 52a. In the following description the regions 52a and the regions 52b will be called lateral regions and longitudinal regions, respectively, and these regions 52a and 52b will collectively be referred to as light-shield grille. Considering in the thickness direction of the film 50 the lateral regions 52a are normal to the major surfaces of the film 50, but the longitudinal regions 52b are uniformly slanting. That is, each of the longitudinal regions 52b forms an angle $\sigma$ with a plane normal to the major surfaces of the film 50, and the angle $\sigma$ equals to the refraction angle $\sigma$ of light $L_p$ in the exposure operation illustrated in FIGS. 1 and 2. Therefore, the slant angle $\sigma$ in FIG. 4 is 28° in this example. The aperture film 50 produced in this example was 150 mm wide and 100 mm long and had a thickness (H in FIG. 4) of 0.59 mm. On each side of this aperture film 50 each of the light-transmitting rectangular apertures 54 had a width $W_h$ of 0.50 mm and a length $W_v$ of 0.38 mm, and the lateral pitch $P_h$ of these apertures was 0.54 mm and the longitudinal pitch $P_v$ was 0.42 mm.

Figure 5:
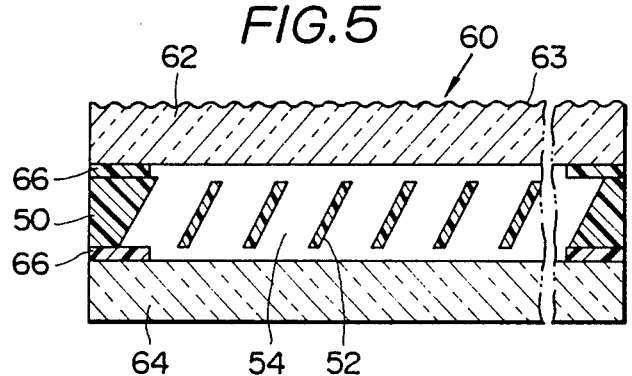
FIG. 5 is an enlarged sectional view of a light-shield board including the aperture film of FIGS. 3 and 4.

FIG. 5 shows a directional light-shield board 60 which is an embodiment of the invention and includes the aperture film 50 of FIGS. 3 and 4. The light-shield board 60 is produced by interposing the aperture film 50 between an uncolored polycarbonate plate 62 having a thickness of 0.5 mm and a colorless and transparent polycarbonate plate 64 having a thickness of 0.5 mm. The aperture film 50 is bonded to each polycarbonate plate with a double-faced adhesive tape 66 having a thickness of 0.1 mm. The uncolored polycarbonate plate 62 exhibits an almost uniform spectral transmittance for visible light in the wavelength range of 400–700 nm so that the color tone of a visual display to be sighted through this light-shield board 60 remains almost unchanged. In respect of the degree of transparency the material of the uncolored polycarbonate plate 62 was selected such that the transmittance for whole rays was 70.7%. If the degree of transparency of this plate 62 is too high the reflectivity of the outer surface of the plate becomes undesirably high, and if the degree of transparency is too low the amount of the transmitted light becomes so small as will lead to significant lowering of the contrast of the sighted display. For similar reasons the material of the colorless and transparent polycarbonate plate 64 was selected such that the transmittance for whole rays was 90.5%. When this light-shield board 60 is disposed in front of a visual display device the transparent polycarbonate plate 64 faces the display device.

The outer surface of the uncolored polycarbonate plate 62 is uniformly made a rough surface 63. In this example the central line average height of the rough surface 63 was 0.25 μm when measured by the method according to JIS B 0601, and the gloss of the rough surface 63 in terms of specular gloss measured by the 60°–60° method according to JIS K 5400 was 72.7% relative to the specular gloss of the smooth surface before the roughening treatment. The rough surface 63 is produced for suppressing mirror reflection of extraneous light and also for preventing the appearance of Moire fringes. It is suitable to limit the degree of roughening of this surface to the level of about 0.25 μm in terms of central line average height, because excessive roughening of the surface impairs the diffusion angle limiting effect of the aperture film 50 and obscures the display sighted through the light-shield board 60. In the aperture film 50, the wall surfaces 53 of the light-shield grille 52 are rough surfaces by the effect of the fine powder of silica added to the photosensitive resin as the material of the aperture film 50. Therefore, reflection of light from these wall faces 53 does not produce ghost images.

Figure 6:
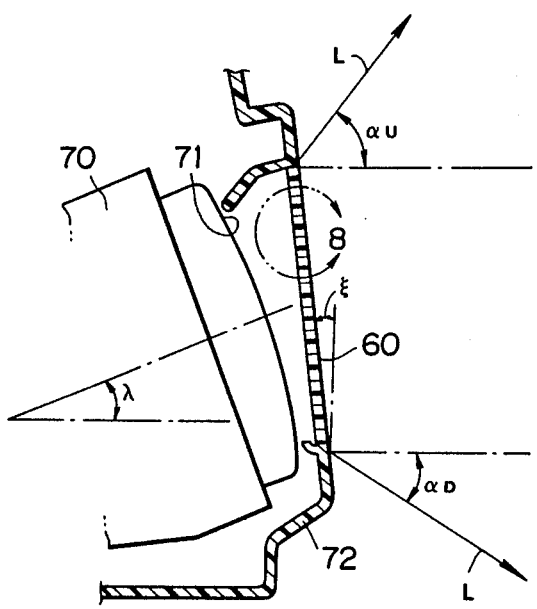
FIG. 6 is an illustration of the manner of disposition of the light-shield board of FIG. 5 in front of a car television set in the instrument panel of an automobile.
Figure 7:
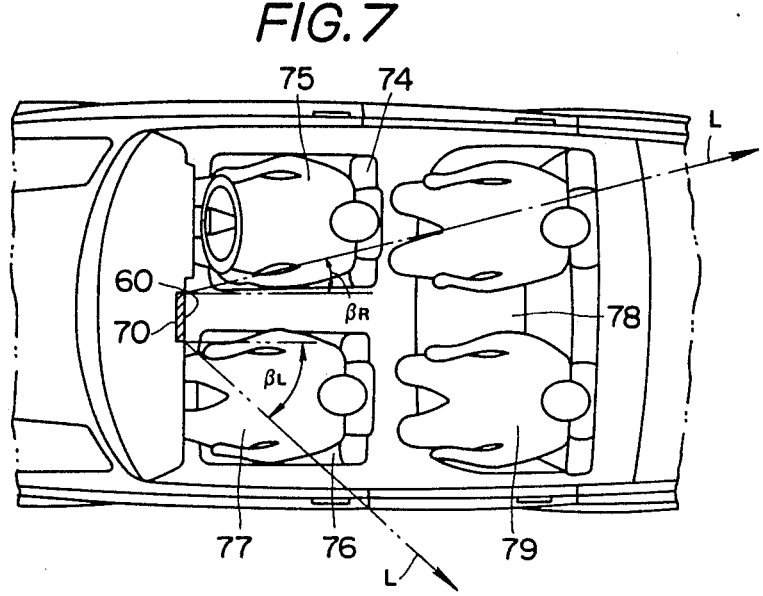
FIG. 7 is a plan view of the passenger room of the automobile in which the television set and the light-shield board of FIG. 6 are installed.
Figure 8:
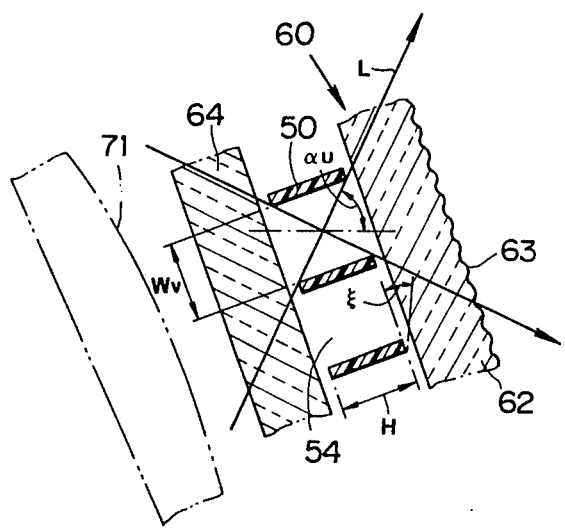
FIG. 8 is an enlargement of the area circled with arrow 8 in FIG. 6.

Referring to FIGS. 6–8, the above described light-shield board 60 was installed in the instrument panel 72 of an automobile as an attachment for a car television set 70 placed in the middle part of the instrument panel. As shown in FIG. 6 the light-shield board 60 was positioned just in front of the screen 71 of the television set 70. The screen 71 of the television set 70 was inclined upward so as to form an angle λ of 20.5° with a horizontal plane, and the light-shield board 60 was inclined toward the screen 71 so as to form an angle } of 9° with a vertical plane. In the thus placed light-shield board 60 the lateral regions 52a of the aperture film 50 were extending horizontally, and the longitudinal regions 52b were slanting toward the front lefthand seat 76. In this car the driver's seat 74 was on the righthand side.

For each of the driver 75, passenger 77 in the front lefthand seat 76 and passengers 79 in the back seat 78, ease or difficulty in viewing the television screen 71 through the light-shield board 60 was examined. The provision of the light-shield board 60 placed strict limitations on the diffusion of light L from the television screen 71 in the upward, downward, rightward and leftward directions. Referring to FIG. 6, the limit angle of upward diffusion $\alpha_U$ was 41.8° and the limit angle of downward diffusion $\alpha_D$ was 23.8°. Referring to FIG. 7, the limit angle of rightward diffusion $\beta_R$ was 17.5° and the limit angle of leftward diffusion $\beta_L$ was 54.1°. Since the limit angle $\beta_R$ of diffusion toward the driver's seat 74 was so small while the limit angle $\beta_L$ of diffusion toward the lefthand seat 76 was sufficiently large, the effect of the light-shield board 60 was as if a blind screen were placed between the television screen 71 and the driver's seat 74. That is, the driver 75 in his normal posture could not sight the television screen 71 while the passenger 77 next to the driver 75 and also the passengers 79 in the back seat 78 could easily sight the television screen 71. Accordingly it is unlikely that the driver 75 is absent-mindedly absorbed in the pictures on the television screen 71. Furthermore, during driving in the night the light-shield board 60 protects the driver 75 from being dazzled by the light L from the television screen 71.

Besides the function of controlling the diffusion of light L from the television screen 71, the light-shield board 60 serves the purpose of restricting the incidence of extraneous light on the screen 71. Therefore, degradation of the contrast of the displayed images by reflection of extraneous light is prevented. The adequate degree of transparency of the uncolored polycarbonate plate 62 and the rough surface 63 of that plate 62 contribute to clear sighting of the television screen 71 by the passengers 77, 79 through the light-shield board 60.

Generally for passenger cars of the type illustrated in FIG. 7, it has been clarified that the light-shield board 60 must be designed and disposed so as to meet the following requirements in respect of the limit angles of diffusion of light L from the television screen if it is intended to inhibit only the driver 75 from sighting the screen 71.

Limit angle of rightward diffusion: $\beta_R < 20°$
Limit angle of leftward diffusion: $\beta_L > 40°$
Limit angle of upward diffusion: $40° < \alpha_U < 70°$ If the limit angle of upward diffusion $\alpha_U$ is made greater than 70° the images on the screen 71 will possibly be reflected in the windshield of the car. If the limit angle $\alpha_U$ is smaller than 40° difficulty arises in sighting the screen 71 from the upper level of the passenger's eyes, To meet the above requirements, the relations between the installation angle $\xi$ of the light-shield board 60, the slant angle $\sigma$ of the longitudinal regions 52b of the aperture film 50 and the dimensions of the light-transmitting apertures 54 should be as follows.

$\tan(40° - \xi) < W_v/H < \tan(70° - \xi)$, on condition that $\xi < 40°$
$\tan 40° - \tan\sigma < W_h/H < \tan 20° + \tan\sigma$, on condition that $\sigma > 17.6°$
$\tan(\alpha_U - \tau) = W_v/H$
$\tan\beta_R = W_h/H - \tan\sigma$
$\tan\beta_L = W_h/H + \tan\sigma$ Therefore, in producing the aperture film 50 for the light-shield board 60 it is necessary to determine the dimensions of the apertures 54 and the slant angle of the longitudinal regions 52b with consideration of the angle $\xi$ of installation of the light-shield board 60 too.

Figure 13:
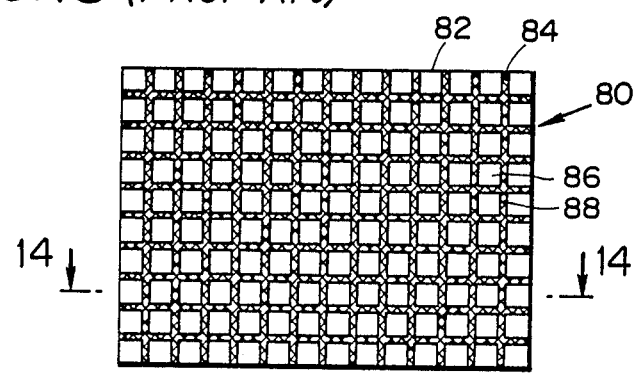
FIG. 13 is an explanatorily enlarged view of a known light-shield board.
Figure 14:
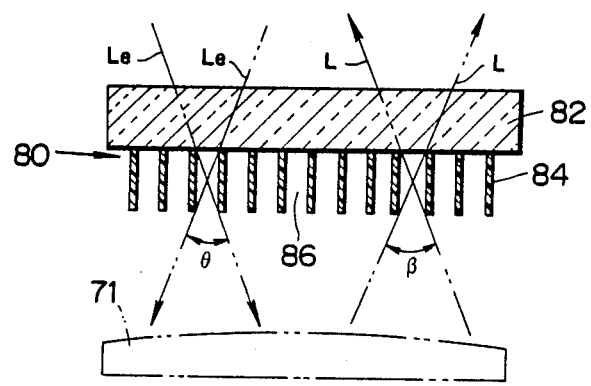
FIG. 14 is a sectional view taken along the line 14—14 in FIG. 13.

FIGS. 13 and 14 show a conventional light-shield board 80 which is produced by bonding an aperture film 84 to a transparent plate 82. The aperture film 84 is formed with a number of rectangular apertures 86 in a checkered pattern. No portion of the opaque regions 88 of the aperture film 84 is inclined from a plane normal to the film 84. The aperture film 84 can be produced by a photolithographic method using a photosensitive resin which may optionally contain a fine powder of silica or the like. In this case, however, a layer of the photosensitive resin is irradiated with ultraviolet rays that propagate substantially normal to the resin layer.

The placement of this light-shield board 80 in front of a television screen 71, for example, is effective for preventing degradation of the contrast of the displayed images by reflection of extraneous light $L_e$ since the opaque regions 88 of the aperture film 84 place limitations on the angle of incidence $\theta$ of the light $L_e$. Besides, the light-shield board 80 allows diffusion of light L only within a limited angle $\beta$ so that sighting of the television screen 71 from sideways distant positions is inhibited. However, this light-shield board 80 darkens the image on the screen 71 for every observer who is obliquely looking at the screen 71 irrespective of the direction of obliqueness. When this light-shield board 80 is applied to the car television set 70 in FIG. 7 the presence of the light-shield board 80 has the same effects on both the driver 75 and the passenger 77 on the lefthand side.

Figure 9:
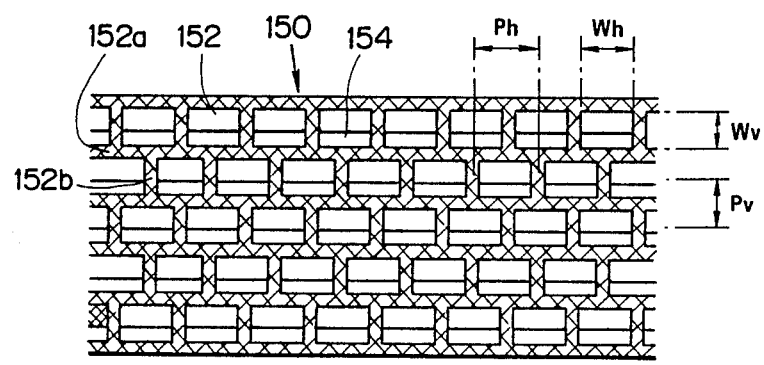
FIG. 9 is a partial and enlarged plan view of an aperture film used in another embodiment of the invention.
Figure 10:
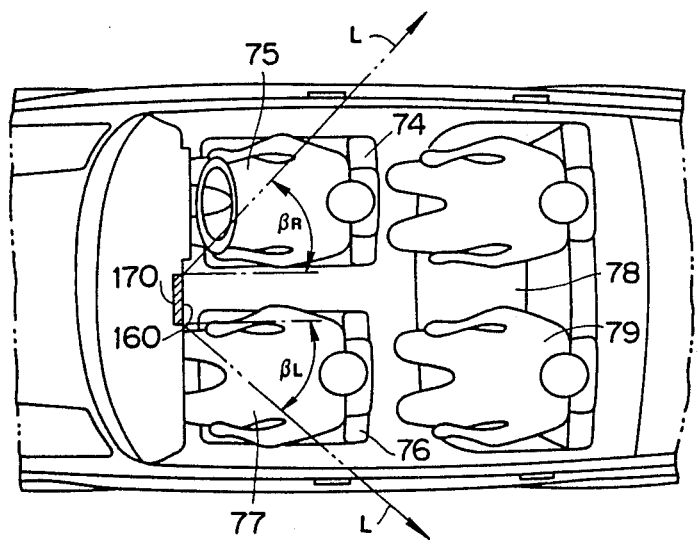
FIG. 10 is a plan view of the passenger room of an automobile in which a light-shield board using the aperture film of FIG. 9 is installed in the instrument.
Figure 11:
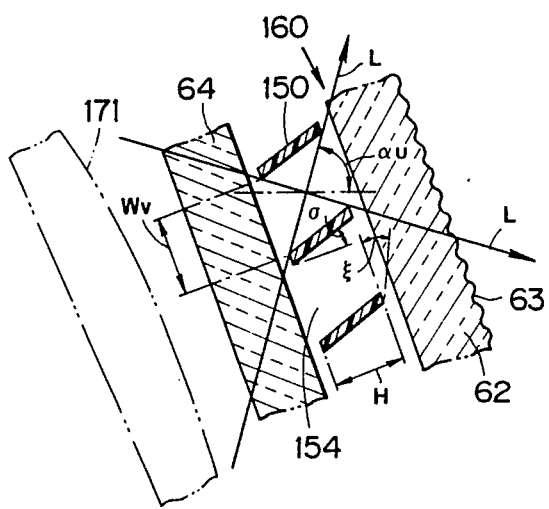
FIG. 11 is a partial and enlarged sectional view of the light-shield board in FIG. 10.

FIGS. 9–12 illustrate another embodiment of the invention. As shown in FIG. 9, an aperture film 150 used in this embodiment has a widthways oblong rectangular shape and is formed with a number of rectangular apertures 154 in a staggered checkered pattern. In other words, the film 150 consists of rows of widthways elongate regions 152a and a number of lengthways extending regions 152b each of which is a bridge between two adjacent lateral regions 152a. In this aperture film 150 the longitudinal regions 152b are normal to the major surfaces of the film 150, and the lateral regions 152a are uniformly slanting. As shown in FIG. 11, each of the lateral regions 152a forms an angle $\sigma$, which is 20° in this example, with a plane normal to the film 150. This aperture film 150 was produced by the photolithographic method described hereinbefore with reference to FIGS. 1 and 2. In this case, however, the mask sheet 16 was rotated by 90° from the orientation in the previous example, and the angle of incidence $\gamma$ of the parallel rays $L_P$ on the printing frame 10 was 31° so that the refraction angle $\sigma$ became 20°. The thickness H of the aperture film 150 was 0.42 mm.

A directional light-shield board 160 according to the invention was produced by interposing the aperture film 150 of FIG. 9 between the uncolored polycarbonate plate 62 and the transparent polycarbonate plate 64 described hereinbefore with reference to FIG. 5.

In FIG. 10, numeral 170 indicates a multiple switch device which includes a cathode-ray tube for displaying several kinds of electrically operated accessories and for allowing the driver 75 to selectively operate any one of the accessories by simply touching the screen 171 of the cathode-ray tube at the location where the selected accessory is displayed. Therefore, the driver 75 must be able to clearly sight the displayed pictures. The light-shield board 160 was placed in front of the screen 171 such that the lateral regions 152a of the aperture film 150 were extending horizontally and slanting upward. The screen 171 was inclined upward so as to form an angle of 20.5° with a vertical plane, and the inclination angle $\xi$ of the light-shield board 160 was 9°.

Figure 12:
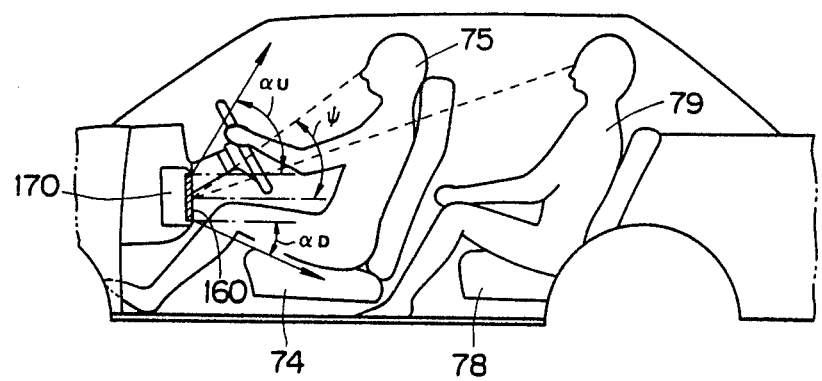
FIG. 12 is an elevational view of the passenger room of FIG. 10.

For each of the driver 75 and passengers 77 and 79 in FIG. 10, ease of difficulty in viewing the screen 171 through the light-shield board 160 was examined. With respect to diffusion of light L from the screen 171 the limit angle of rightward diffusion $\beta_R$ (toward the driver 75) was 50°, and the limit angle of leftward diffusion $\beta_L$ was also 50°. Referring to FIGS. 11 and 12, the limit angle of upward diffusion $\alpha_u$ was 68.6° and the limit angle of downward diffusion $\alpha_D$ was 19.4°. For the driver 75 the angle of depression $\phi$ to look at the screen 171 was 35°. In this case, the driver 75 and the passengers 77, 79 were all able to clearly sight the pictures displayed on the screen 171 through the light-shield board 160. The display of the multiple switch device 170 is located below the level of the driver's and passengers' eyes. Since the lateral regions 152a of the aperture film 150 in the light-shield board 160 are slanting upward to render the limit angle of upward diffusion $\alpha$ hd U sufficiently large, the driver 75 can clearly sight the entire area of the screen 171 and he does not suffer from obscurity in the lowermost area of the screen 171 although the angle of depression $\phi$ for the driver 75 is relatively large.

Generally for passenger cars of the type illustrated in FIGS. 10 and 12, it has been clarified that the driver 75 and every passenger 77, 79 can easily sight the screen 171 through the light-shield board 160 when neither of the limit angles of rightward and leftward diffusion $\beta_R$ and $\beta_L$ is smaller than 40°.

To ensure such an extent of diffusion of light L, the relations between the installation angle $\xi$ of the light-shield board 160, the slant angle $\sigma$ of the lateral regions 152a of the aperture film 150 and the dimensions of the light-transmitting apertures 154 should be as follows.

$\tan(40° - \xi) - \tan\sigma < W_v/H$
$\tan(70° - \xi) - \tan\sigma > W_v/H$
(on condition that $0 < \sigma < 40° - \xi$)
$W_h/H > \tan 40°$
Notes: $\tan(\alpha_U - \xi) = W_v/H + \tan\sigma$
$\tan\beta_R = \tan\beta_L = W_h/H$ Therefore, in producing the aperture film 150 for the light-shield board 160 it is necessary to determine the dimensions of the apertures 154 and the slant angle of the lateral regions 152a with consideration of the angle $\xi$ of installation of the board 160 too.

What is claimed is:

1. A directional light-shield board for placement in front of a visual display device, the light-shield board comprising:
    a transparent substrate; and
    an opaque film which is bonded to a major surface of said substrate and is formed with a number of substantially uniformly distributed light-transmitting apertures such that said opaque film comprises a number of wall-like parts respectively partitioning said apertures,
    said apertures having a substantially rectangular shape and arranged in a checkered pattern, said apertures being bored obliquely such that at least a first pair of parallel wall-like parts of said opaque film are substantially unidirectionally inclined from a plane normal to said surface of said substrate and such that an apparent area of each of said apertures become maximum when the light-shield board is viewed from the direction of the inclination of said wall-like parts of said film.

2. A light-shield board according to claim 1, wherein said checkered pattern is a staggered checkered pattern.

3. A light-shield board according to claim 1, wherein each of the rectangular light-transmitting apertures further comprises a second pair of parallel wall-like parts of said film, said second pair of wall-like parts being normal to said plane.

4. A light-shield board according to claim 3, wherein said opaque film formed with said apertures is produced by a photolithographic method using a photosensitive resin as the material of said film.

5. A light-shield board according to claim 1, further comprising a light-transmitting plate which is arranged opposite to said transparent substrate and to which said opaque film is bonded.

6. A light-shield board according to claim 5, wherein said light-transmitting plate is lower in transmittance than said transparent substrate.

7. A light-shield board according to claim 5, wherein an outer surface of said light-transmitting plate is made a rough surface.

8. A light-shield board according to claim 7, wherein surface roughness of said rough surface is not greater than about 0.25 microns in terms of center line average height.

9. A light-shield board according to claim 1, wherein said opaque film formed with said apertures is produced by a photolithographic method using a photosensitive resin as the material of said film.

10. A light-shield board according to claim 9, wherein said photosensitive resin contains a matting agent.

11. A light-shield board having a transparent substrate and an opaque film comprising at least a first pair of parallel wall-like parts which are substantially unidirectionally inclined from a plane normal to a surface of said substrate and having at least a second pair of parallel wall-like parts which are normal to the plane of the substrate, prepared by a process consisting essentially of the steps of:
    placing a mask sheet on a first transparent glass plate;
    overlaying a first transparent polyester film onto said mask sheet;
    locating a spacer on said first transparent glass plate so as to form a border around said mask sheet and said first transparent polyester film;
    depositing a photosensitive liquid resin onto said first transparent polyester film;
    overlaying a second transparent polyester film onto said photosensitive liquid resin;
    placing a second transparent glass plate on said second transparent polyester film so as to provide a curing assembly;
    directing rays of light through said curing assembly to cure selected portions of said photosensitive liquid resin;
    treating said selected cured portions of said photosensitive resin to produce a suitable aperture film; and
    mounting said aperture film onto said substrate.

* * * * *